June 13, 1944. F. R. KLING 2,351,132
HAT SWEAT BAND, AND MEANS FOR JOINING THE ENDS THEREOF
Filed June 25, 1942

INVENTOR.
Ferd R. Kling.
BY
ATTORNEYS.

Patented June 13, 1944

2,351,132

UNITED STATES PATENT OFFICE 2,351,132

HAT SWEATBAND AND MEANS FOR JOINING THE ENDS THEREOF

Ferd R. Kling, New York, N. Y.

Application June 25, 1942, Serial No. 448,355

1 Claim. (Cl. 2—181)

My invention relates to sweat bands of all kinds, the ends of which must be joined in adapting the same as part of the hat.

It is an object of my invention to provide a hat sweat band, having novel joining means adapted to bind the ends of the hat sweat band securely, to conceal the joint, and to present an improved finished appearance in the band.

It is a further object to provide such joining means as will be of improved resistance to rotting and resulting odor, which occurs from the absorption of perspiration in the means currently in use.

It is also an object to provide such joining means, having readily accessible parts for carrying the brand, and name of customer and other necessary indicia.

It is a further object to provide a simplified joining means, adapted to reduce the number of manufacturing operations necessary to join the ends of a hat band as practiced in the current art, to produce substantial saving in labor and material cost.

It is a further object to provide a novel method for joining the ends of hat sweat bands, to achieve the above advantages.

My invention also has for its objects such as hereinafter are made to appear, and its nature, its features and advantages will appear in the course of the description.

My invention is also in the combination and arrangement of parts and details of construction as herein set forth and claimed.

Reference is had to the accompanying drawing, part of this specification, to explain my invention, it being however, illustrative of only one of the embodiments which my invention may take.

Similar numbers refer to similar parts throughout the several views.

Figure 1:
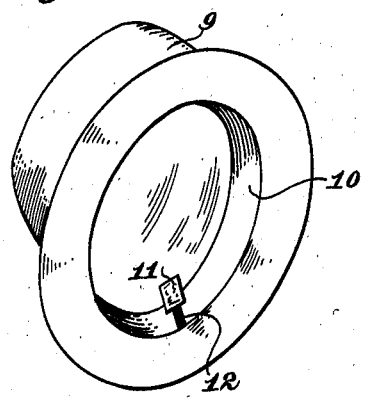
Fig. 1 is a view in perspective showing the improved hat band with joining means and portion for receiving the imprint of necessary indicia.
Figure 2:
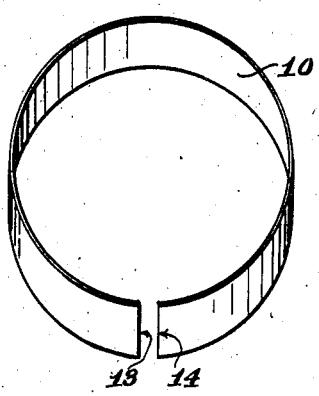
Fig. 2 is a view of a hat sweat band before being joined.

Referring more particularly to the drawing, Fig. 1 shows a hat 9 with the improved sweat band 10, having the main joining portion 12, and additional joining portion 11, which is also adapted to carry the brand name or other indicia. In Fig. 2, there is shown a sweat band of leather with its ends 13, 14 unjoined, preliminary to the application of my improved and novel joining means.

Figure 3:
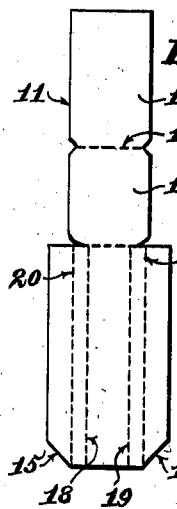
Fig. 3 is a plan view of a blank used to make the joining means.
Figure 4:
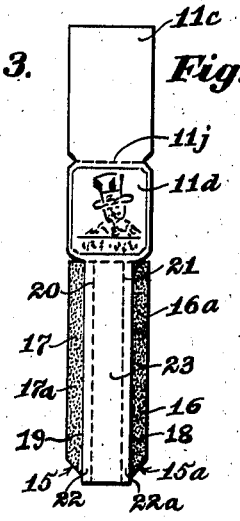
Fig. 4 is a front view of the joining means.
Figure 5:
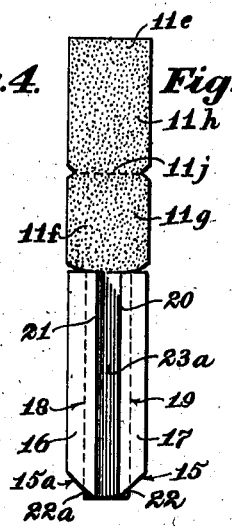
Fig. 5 is a rear view of the joining means.

In Fig. 3, there is shown the underside of a leather blank, preliminary to folding the same to the shape shown in Figs. 4 and 5. In Fig. 3, the dotted lines 18, 19, 20, 21 show the places along which folding takes place. The folding along these lines produces a welt 23, two grooves, 22 and 22a, a channel 23a, and two side extensions 16, 17, all shown in Figs. 4 and 5. The side extensions are cut diagonally at their ends 15, 15a, so that when the band is sewn into the hat, less thickness is presented for stitching. The side extensions are provided with a coat of mucilage, 16a, 17a, which becomes adhesive by moistening. The usual types of adhesive known in the leather art may be used, but I prefer to use for that purpose any suitable odorless animal glue. The glue is applied to the surface of the extensions, and allowed to dry. When it is necessary to apply the joining means, the surface is made adhesive again by merely dampening it.

The portion 11, has an upper section 11a, and lower section 11b, as shown in Fig. 3. The face carrying the indicia is shown as 11d, which face is exposed to view in the finished hat band. The face 11c is in back of 11d when folded along line 11j. In Fig. 5, the reverse of Fig. 4 is shown and the opposing faces 11e and 11f bear a coat of mucilage 11g and 11h. The mucilage is the same type as used for the side extensions and is similarly applied.

In joining the ends of the sweat band to produce the improved band, I moisten each end 13, 14 on its under face and then apply each end to the adhesive area 16a, 17a, of extensions 16, 17, securely pressing the ends into the corresponding grooves, 22, 22a. Then I moisten surfaces 11e and 11f and bring said surfaces together by bending portion 11a along line 11j. The whole joining means is then subjected to pressure, and allowed to dry. When dry the band is sewn into the hat by means customary in the art.

Figure 8:
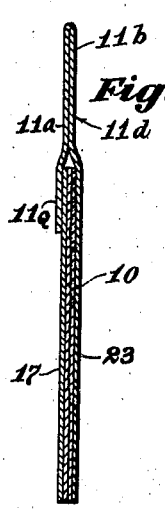
Fig. 8 is a section on an enlarged scale of the joining means taken along line 8—8 of Fig. 6.

It will be observed that the end portion 11a of upper portion 11a serves to more securely bind the parts together, as shown in Fig. 8.

However, this is not absolutely essential and portion 11a may be dispensed with leaving only 11b which will receive the hat indicia. Of course, the extension 11b is also not essential, for the joining function may be performed without it and the indicia applied as is customary, on the band. However, the embodiment as shown is preferable, since it achieves all the advantages sought. The result is a sweat band securely joined, having a tab 11 of double thickness, with provision for receiving the imprint of the brand or other indicia. It has been customary to imprint the brand and customer's name upon the main sweat band. The use of the tab surface for this purpose dispenses with this need.

Figure 6:
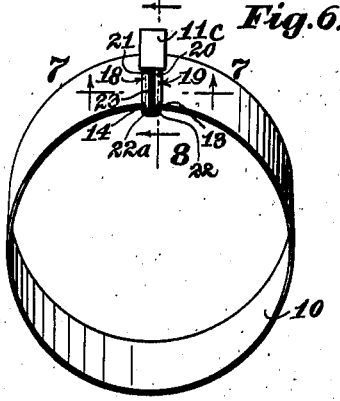
Fig. 6 is a view in perspective of a hat sweat band to show the rear view of the joining means.
Figure 7:
Fig. 7 is a section on an enlarged scale of the joining means taken along line 7—7 of Fig. 6.

In Fig. 6 a sweat band is shown, to illustrate the manner in which the ends of the sweat band are inserted into the grooves 22, 22a. Fig. 7 is a section along line 8—8 of Fig. 7, to show the cooperative relations of the various parts.

The means thus disclosed of a novel way of joining the ends obviates the necessity of the sewing step, essential in the current art. The means simplifies considerably the current way of joining the ends, the method in accordance with my invention being essentially manual.

In the current art, it is customary to sew the ends of the sweat band together with silk thread, and then it is necessary to finish the joint with an ornamental portion such as a silk bow which is also sewed to the leather. Both of these operations require expensive sewing machines, and the silk bow is an additional expense, which is presently prohibitive. The perspiration is absorbed by the silk or other thread, causing the joint to rot and become odoriferous.

My invention obviates these disadvantages. It dispenses with the need of costly sewing machines, and the incidental skilled labor. It provides an improved substitute for the silk thread and bow, again substantially reducing the cost. It substitutes a manual method, in place of expensive machines, which is equally as efficient.

Having thus described my invention, I claim:

In a hat sweat band having a sweat band member, means for joining the ends of said member, comprising an overlapping welt to conceal said ends, grooved portions in said welt to join said ends, said grooved portions being disposed in spaced relation on opposite sides of said welt to form a channel between them; a flap extending from said welt, comprising a face portion adapted to receive hat indicia, and a back portion extending beneath and secured to said grooved portion; and means adapted to securely unite said grooved portions and ends.

FERD R. KLING.